United States Patent [19]

Lazovsky et al.

[11] 4,304,674

[45] Dec. 8, 1981

[54] METHOD OF DISPOSING OF A WASHING WATER SLUDGE FROM FILTERING SYSTEMS

[76] Inventors: Yakov B. Lazovsky, Liteiny prospekt, 24, kv. 32; Mark G. Novikov, ulitsa Mayakovskogo, 17, kv. 3; Andrei I. Kostrits, ulitsa Sedova, 20/32, kv. 12; Valery Y. Rotan, ulitsa Chaikovskogo, 42, kv. 7; Vladimir F. Sheryakov, ulitsa Ryleeva, 6, kv. 42, all of Leningrad, U.S.S.R.

[21] Appl. No.: 100,217

[22] Filed: Dec. 4, 1979

[51] Int. Cl.³ ............................................. C02F 11/14
[52] U.S. Cl. .................................. 210/751; 106/97; 106/103; 210/768
[58] Field of Search .................... 106/89, 90, 97, 103; 210/10, 42 R, 45, 51, 59, 66–68, 73 S, 81, 82, 609, 702, 710, 714, 723, 751, 768, 791; 405/128, 129, 266

[56] References Cited

U.S. PATENT DOCUMENTS

| | | | |
|---|---|---|---|
| 154,093 | 8/1874 | Scott | 106/103 |
| 3,442,498 | 5/1969 | Davis | 210/45 |
| 3,720,608 | 3/1973 | Stauffer | 210/10 |
| 3,947,283 | 3/1976 | Uchikawa et al. | 106/89 |
| 3,980,558 | 9/1976 | Thompson | 210/59 |
| 4,028,130 | 6/1977 | Webster et al. | 210/59 |
| 4,116,705 | 9/1978 | Chappell | 106/90 |

FOREIGN PATENT DOCUMENTS

| | | | |
|---|---|---|---|
| 50-33175 | 4/1975 | Japan | 106/89 |
| 53-27236 | 8/1978 | Japan | 210/10 |

*Primary Examiner*—Peter A. Hruskoci
*Attorney, Agent, or Firm*—McAulay, Fields, Fisher, Goldstein & Nissen

[57] ABSTRACT

A washing water sludge from filtering systems, obtained through settling thereof, is disposed of by being introduced into a concrete mix as the mixing water for the preparation of concrete.

1 Claim, No Drawings

METHOD OF DISPOSING OF A WASHING WATER SLUDGE FROM FILTERING SYSTEMS

FIELD OF THE INVENTION

The present invention relates to the field of pollution abatement, and more particularly to a method of utilization of a washing water sludge from filtering systems, which is claimed for the first time and which can be applied in potable and industrial water supply at treatment plants processing both surface and underground water sources containing primarily the salts of aluminum and the salts of iron, respectively. Besides, the present invention can find rather wide application in constructional industry for concrete production.

BACKGROUND OF THE INVENTION

Since potassium alum was employed in Ancient Egypt for clarification of water of surface water sources, there appeared a need for removal of the sludge staying in barrels after decantation of the settled water. However, the quantity of this sludge did not put forth acute problems before mankind.

Subsequently, the processes of water treatment began to employ slow filters wherein water was purified due to biological processes in the surface film, and regeneration of filters consisted in removal of a filtering layer 5 to 10 mm thick.

Since this method of regeneration did not require washing water, the problem of sludge disposal did not naturally arise.

With the advent of rapid filtration, a filtering charge entrapping various contaminants in the course of filtration has been regenerated by an upstream flow of water, which has raised the problem of treatment of washing water and in particular the problem of treatment and utilization of washing water sludge.

According to the present state of the art, a water treatment plant with an output of 1,000,000 cubic meters per 24 hours requires about 50,000 cubic meters of washing water per 24 hours.

This washing water contains about 2,500 cubic meters of the sludge.

Most water treatment plants in different countries discharge their washing water with the sludge therein into neighboring streams and lakes, frequently into those which serve as a source of water supply. Such a practice results in a serious pollution of the environment particularly when water treatment plants are located in cascade on large rivers and each downstream plant treats not only river water, but also a considerable amount of the sludge discharged by an upstream plant.

More rarely, washing water is settled and either again subjected to the process of treatment or, with an addition of a sufficient proportion of pure water, is employed for washing of filters.

At present, rather a large number of methods of treatment of the washing water sludge is known to those skilled in the art.

As a rule, the washing water sludge is subjected to thickening by means of additional settling for a few days, filtering through drum vacuum filters or centrifuging.

However, a high specific resistance of the sludge hinders its dewatering and hence thickening, which makes its filtering and centrifuging inefficient.

For the same reason many attempts to prevent the pollution of the environment by washing water sludge involve the reduction of a sludge volume by means of thermal drying or freezing out thereof.

Freezing out of the sludge as well as its thermal drying makes it possible to reduce the sludge volume scores of times, its concentration being simultaneously increased.

In particular, there is known in the prior art a method of treatment of washing water sludge (cf. U.S. Pat. No. 3,720,608), consisting in dewatering of the sludge by means of thermal drying.

Also known in the art is a method of treatment of washing water sludge (cf. U.S. Journal "Water and Sewage Works", v. 112, No. 11, 1965, pp. 401–406), consisting in dewatering of the sludge by means of thermal drying which is preceded by freezing and thawing of the sludge, intended to destroy its structure and thus to increase the efficiency of its dewatering.

Besides, there is known in the art a method of sludge treatment (cf. U.S. Journal "AWWA", v. 61, No. 10, 1966, pp. 541–566), consisting in dewatering of the sludge by freezing out thereof whereupon it is subjected to vacuum filtering.

All the methods of sludge treatment mentioned hereinabove enable the sludge volume to be reduced scores of times, its concentration being simultaneously increased. However, all these methods are rather expensive since they require special equipment and considerable consumption of energy. Besides, they do not solve the problems of pollution abatement since the sludge dewatered by any of these methods is always removed to a dump where it is dissolved by rain-water, melted snow, and floods and brought back into surface lakes and streams and ground water horizons.

Thus, though the cost of sludge treatment has risen considerably and sometimes exceeds that of potable water treatment, the present state of the art does not prevent the pollution of the environment by the washing water sludge which is not utilized in any way.

In this respect only utilization of washing water or sludge contained therein makes it possible to solve the problem of pollution abatement and to bring it into agreement with the requirements of maintaining an ecological balance.

Though the problem of preventing the pollution of the environment by washing water sludge has long been in existence, it has not been solved up to the present since there are no methods for utilization of this sludge.

Summary of the Invention

It is an object of the present invention to provide an inexpensive method for utilization of a washing water sludge, enabling it to find useful application.

It is another object of the present invention to prevent the pollution of the environment by a washing water sludge. With these and other objects in view there is provided a method for utilization of a washing water sludge of filtering systems, obtained through its settling, consisting in that, according to the invention, the washing water sludge is introduced into a concrete mix as a mixing water.

Introduction of the washing water sludge into the concrete mix makes it possible to utilize the sludge and prevent the pollution of the environment.

Introduction of the sludge in the amount providing a water-cement ratio of less than 0.35 results in considerable degradation of the strength properties of the concrete because of insufficient moistening of the concrete mix and in complication of the process of concrete compression. Introduction of the sludge in an amount providing a water-cement ratio of more than 0.7 also results in degradation of the strength properties of the concrete because of excessive moistening of the concrete mix.

It is advisable that the washing water sludge containing essentially the salts of iron should be introduced into the concrete mix in an amount providing a water-cement ratio in the range of 0.35 to 0.70.

Introduction of the sludge containing primarily the salts of iron into the concrete mix within said range makes it possible not only to utilize the sludge and thus to prevent pollution of the environment, but also to obtain concrete with improved strength properties as compared to those of the concrete mixed with tap water, the strength properties of the concrete being improved not due to the increase of its weight, but due to the formation of stronger structures as a result of interaction of the iron-containing sludge with the cement. Introduction of the sludge in an amount providing a water-cement ratio of less than 0.35 results in considerable degradation of strength properties of the concrete because of insufficient moistening of the concrete mix and in complication of the process of concrete compression. Introduction of the sludge in an amount providing a water-cement ratio of more than 0.7 also results in degradation of strength properties of the concrete because of excessive moistening of the concrete mix.

The objects and advantages of the present invention will become more apparent upon consideration of the following detailed description of its embodiments.

DETAILED DESCRIPTION OF THE EMBODIMENTS OF THE INVENTION

A method of utilization of a washing water sludge from filtering systems, obtained through its settling, consists in introduction thereof into a concrete mix as the mixing water, the sludge of a washing water supplied from surface water sources, containing essentially the salts of aluminum, being introduced in the amount providing a water-cement ratio in the range of 0.35 to 0.7, and the sludge of the washing water supplied from underground water sources, containing essentially the salts of iron, being introduced in an amount providing a water-cement ratio in the range of 0.35 to 0.7.

To carry out the experiments, a dry concrete mix whose composition was constant for each run was prepared. The materials used for the concrete mix were the following: Brand 100 portland cement sifted through a sieve with a mesh size of 0.9 mm, river quartz sand 0.14 to 5 mm in size with foreign matter content up to 0.5 per cent, and crushed granite 5 to 30 mm in size with foreign matter content up to 0.5 per cent.

A dry concrete mix was prepared indoors at 18° to 20° C. Prior to mixing, the aggregates were conditioned in a drier at 105° C. until they attained a constant weight.

The components were proportioned by weight with an accuracy up to 1 per cent. A dry concrete mix was prepared as follows. The weighed quantity of sand was added with a predetermined amount of cement, and the mix obtained was stirred until it was colored uniformly whereupon coarse aggregate was added and all the dry mix was again stirred until it was distributed uniformly throughout the entire mass.

In so doing, the weight ratio between cement, sand, and crushed stone in the dry mix obtained was equal to 1:2:3, respectively.

A dry concrete mix was mixed with a washing water sludge containing salts of iron. The watered concrete mix was thoroughly mixed until it became homogeneous, the duration of mixing (from the instant of pouring in the mixing water) being from 1 to 5 minutes.

Control experiments were run using tap water. In all the experiments concrete cubes 100×100×100 mm in size.

The specimens were fabricated in the following way were fabricated.

A freshly-mixed concrete was cast into metal molds. The mold were mounted on a table vibrating at a frequency of 2,800 oscillations per second. For mixes with a water-cement ratio below 0.46 in the course of vibrocompression an additional load was used, providing specific pressure upon the surface, equal to 50 gm/cm$^2$. Subsequent to vibrocompression of the concrete mixture, its remains were removed from the surface of the mold with a steel ruler, and the upper open surface was smoothed with a float. The finished specimens were cured in the chamber of normal hardening at a temperature of 20° to 25° C. and relative humidity of 90 to 95 percent.

The appearance and compression strength were the main criteria in testing the concrete specimens.

Evaluated by visual inspection were the state of the surface, color, dampness, presence of cracks and pores. The specimens of each set of experiments were subjected to strength tests in a hydraulic press, the compression being performed at intervals of 7, 28, and 365 days.

EXAMPLE 1

A dry concrete mix was mixed with a washing water sludge containing salts of iron.

Preparation of concrete with a water-cement ratio of less than 0.35 results in degradation of concrete strength and in complication of the process of concrete compression. The amount of the introduced sludge was estimated so that the total amount of water introduced into the concrete mix in the course of pouring was respectively equal to 0.35, 0.40, 0.50, 0.60, and 0.70. Preparation of the concrete mixture with a water-cement ratio of more than 0.7 results in poor strength properties from the the concrete made of over-moistened mixture.

The composition of the sludge was characterized by the following factors:

| | |
|---|---|
| Dampness | 99.3% |
| Dry sludge density | 2.7 gm/cm$^3$ |
| Solid phase content | 0.7% |
| Iron content after calcination, calculated as $Fe_2O_3$ | 84% |
| Hardness salts content calculated as $CaO + MgO$ | 15.1% |
| Organic impurities content (humin substances) | 0.63% |
| Unidentified impurities content | 0.2% |

A set of 9 specimens was made for each water-cement ratio. The results of compression strength tests of the specimens are given in Table 2.

Comparing Tables 1 and 2, it is seen that the concrete poured with the use of the washing water sludge containing primarily the salts of iron exhibits improved strength properties, the latter being achieved not due to the increase of the specimen weight, but due to the formation of stronger structures as a result of interaction of the iron-containing sludge with cement, whereas in the known methods high-strength concrete is obtained by the introduction of very hard aggregates such as black iron ore, lode ore, scrap, having an increased volume weight.

Thus, realization of the proposed method, as far as the washing water sludge containing iron oxides is concerned, makes it possible not only to utilize this sludge for concrete pouring, but also to obtain the concrete of improved strength without an increase in its weight.

From the specific embodiments of the present invention considered hereinabove, it is readily apparent to those skilled in the art that all the objects and advantages of the invention can be accomplished within the scope of the appended claims. It is also apparent that insignificant changes in the operations of the method of utilization of washing water sludge can be made without departing from the spirit of the invention. All these insignificant changes are considered to be within the spirit and scope of the invention as defined in the claims below.

The advantages of the present invention reside in the fact that, for the first time, a method has been developed for utilization of washing water sludge, which prevents the pollution of the environment by such a sludge. What is more, the sludge has found rather efficient application. The concrete obtained using the washing water sludge containing essentially the salts of aluminum exhibit strength properties similar to those of the conventional concrete made with tap water. The concrete obtained by using the washing water sludge containing essentially the salts of iron possesses strength properties superior to those of the conventional concrete made with tap water and similar to the strength properties of special high-strength concretes, the sludge-mixed concrete being of lower specific weight than the last-mentioned ones. The proposed method for utilization of washing water sludge is very cheap and easy to carry out since it requires no special equipment.

TABLE 1

| Series No. | Water-cement ratio | Appearance | Compression strength, in kg/cm$^2$ | | | | | |
|---|---|---|---|---|---|---|---|---|
| | | | 7 days | | 28 days | | 365 days | |
| | | | Specific values | Average values | Specific values | Average values | Specific values | Average values |
| 1 | 0.35 | Smooth surface, light grey color | 247 265 250 | 251 | 331 329 348 | 336 | 372 357 373 | 366 |
| 2 | 0.40 | Smooth surface, light grey color | 229 236 246 | 237 | 338 286 396 | 333 | 381 370 320 | 360 |
| 3 | 0.50 | Smooth surface, light grey color | 145 152 176 | 158 | 232 250 270 | 251 | 231 252 275 | 259 |
| 4 | 0.60 | Dead surface, grey color | 101 102 92 | 98 | 179 196 180 | 185 | 228 230 220 | 228 |
| 5 | 0.70 | Dead surface, grey color | 83 75 63 | 74 | 101 113 109 | 108 | 125 138 149 | 137 |

TABLE 2

| Series No. | Water-Cement ratio | Appearance | Compression strength, in kg/cm$^2$ | | | | | |
|---|---|---|---|---|---|---|---|---|
| | | | 7 days | | 28 days | | 365 days | |
| | | | Specific values | Average values | Specific values | Average values | Specific values | Average values |
| 1 | 0.35 | Smooth surface, light grey color | 235 247 241 | 241 | 334 327 320 | 327 | 400 411 415 | 409 |
| 2 | 0.40 | Smooth surface, light grey color | 260 232 220 | 236 | 343 314 332 | 330 | 401 422 416 | 413 |
| 3 | 0.50 | Smooth surface, light brown color | 170 156 160 | 162 | 253 260 290 | 267 | 275 280 348 | 301 |
| 4 | 0.60 | Smooth surface, light brown color | 113 120 138 | 124 | 196 203 210 | 203 | 268 278 286 | 277 |
| 5 | 0.70 | Dead surface light brown color | 61 82 64 | 69 | 105 107 101 | 104 | 151 138 143 | 144 |

What is claimed is:

1. A method of disposing of a washing water sludge consisting essentially of iron salts, obtained through settling thereof in a water treatment filtering system, said method comprising the steps of adding the sludge to a concrete mix consisting essentially of cement and aggregate to provide a water-cement ratio of 0.35 to 0.70, and allowing the mix to harden into concrete.

* * * * *